US006209036B1

(12) United States Patent
Aldred et al.

(10) Patent No.: US 6,209,036 B1
(45) Date of Patent: Mar. 27, 2001

(54) MANAGEMENT OF AND ACCESS TO INFORMATION AND OTHER MATERIAL VIA THE WORLD WIDE WEB IN AN LDAP ENVIRONMENT

(75) Inventors: Barry Keith Aldred, Weeke (GB); Charles Spencer Brown, Austin, TX (US); Timothy J. Hahn, Vestal, NY (US); Ellen Jean Stokes, Liberty Hill, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/870,718

(22) Filed: Jun. 6, 1997

(51) Int. Cl.[7] .................................................. G06F 15/16

(52) U.S. Cl. ........................ 709/229; 709/200; 709/203; 709/217; 709/219; 709/229; 707/103; 707/513; 707/514

(58) Field of Search .................................... 709/200, 203, 709/206, 217, 219, 227, 229, 105, 202; 707/103, 513, 514, 907

(56) References Cited

U.S. PATENT DOCUMENTS

| | | | |
|---|---|---|---|
| 5,678,041 | * 10/1997 | Baker et al. | 395/187.01 |
| 5,680,455 | * 10/1997 | Linsker et al. | 380/246 |
| 5,724,575 | * 3/1998 | Hoover et al. | 707/10 |

(List continued on next page.)

FOREIGN PATENT DOCUMENTS

| | | |
|---|---|---|
| 0818742 A1 | * 7/1996 | (EP) . |
| 0820026A1 | 1/1998 | (EP) . |
| 0848339A1 | 6/1998 | (EP) . |

OTHER PUBLICATIONS

Yeong et al, RFC 1777 "Lightweight Directory Access Protocol", Mar. 1995.
University of Tasmania, LDAP Directory Services Configuration.*
Jonathan Abbey, ARL Computer Science Division Newsletter, LDAP Directory Services Available, Feb. 1997.*
Project 3: Building a National Research Enterprise (Research Highlights).*
Howes et al., A Scalable, Deployable, Directory Service Framework for the Internet, Aug. 1995.*
Howes et al., Understanding and Deploying LDAP Directory Services, 1999.*
Control Data Systems Inc., Product Overview, 1999.*
Ellis Booker, Mecklermedia Corp., Novell Punches Up its Server Line, May 1996.*
Lynda Radosevich, Netscape announces ONE agreements, May 1997.*
Barb Cole, Lotis Details Future 'Net Plans, Jun. 1996.*
LDAP Directory Services for Weber State University.*
Tom Wu, Research Highlights for Spring 1997.*
Lightweight Directory Access Protocol, ldap@umich.edu, Jul. 1997.*

(List continued on next page.)

Primary Examiner—Mehmet B. Geckil
Assistant Examiner—William C. Vaughn, Jr.
(74) Attorney, Agent, or Firm—Jeffrey S. LaBaw

(57) ABSTRACT

Provided is a method and apparatus for improved access to material via the World Wide Web Internet service. Web page URLs are stored as attribute-values of directory objects and Web page hyperlinks to those directory objects are provided together with access logic responsive to the hyperlinks for retrieving the URLs for use by a client. This indirect access to Web pages via hyperlinks to directories has significant advantages for Web page organization and facilitates more flexible methods of Web page access than the known use of hyperlinks which include URLs pointing directly to the target Web pages.

16 Claims, 4 Drawing Sheets

U.S. PATENT DOCUMENTS

| | | | | |
|---|---|---|---|---|
| 5,751,956 | * | 5/1998 | Kirsch | 709/203 |
| 5,754,830 | * | 5/1998 | Butts et al. | 395/500 |
| 5,761,683 | * | 6/1998 | Logan et al. | 707/513 |
| 5,764,983 | * | 6/1998 | Chew et al. | 709/302 |
| 5,778,181 | * | 7/1998 | Hidary et al. | 395/200.48 |
| 5,787,470 | * | 7/1998 | Desimone et al. | 395/200.56 |
| 5,793,966 | * | 8/1998 | Amstein et al. | 395/200.33 |
| 5,796,952 | * | 8/1998 | Davis et al. | 395/200.54 |
| 5,802,299 | * | 9/1998 | Logan et al. | 395/200.48 |
| 5,812,776 | * | 9/1998 | Gifford | 709/217 |
| 5,812,937 | * | 9/1998 | Takahisa et al. | 455/66 |
| 5,815,663 | * | 9/1998 | Uomini | 709/219 |
| 5,822,539 | * | 10/1998 | Van Hoff | 709/236 |
| 5,870,546 | * | 2/1999 | Kirsch | 709/203 |
| 5,877,759 | * | 3/1999 | Bauer | 345/339 |
| 5,890,172 | * | 3/1999 | Borman et al. | 707/501 |
| 5,893,107 | * | 4/1999 | Chan et al. | 707/103 |
| 5,895,471 | * | 4/1999 | King et al. | 707/104 |
| 5,951,636 | * | 9/1999 | Zerber | 709/202 |
| 5,956,716 | * | 9/1999 | Kenner et al. | 707/10 |
| 5,963,208 | * | 10/1999 | Dolan et al. | 345/357 |
| 5,974,410 | * | 10/1999 | Copeland et al. | 707/3 |
| 5,987,454 | * | 11/1999 | Hobbs | 707/4 |
| 5,987,523 | * | 11/1999 | Hind et al. | 709/245 |
| 5,995,999 | * | 11/1999 | Bharadhwaj | 709/200 |
| 6,016,499 | * | 1/2000 | Ferguson | 707/104 |
| 6,031,836 | * | 2/2000 | Haserodt | 370/389 |
| 6,052,718 | * | 4/2000 | Gifford | 709/219 |
| 6,070,191 | * | 1/2000 | Narendran et al. | 709/226 |

OTHER PUBLICATIONS

Bruce Markey, A System Administrator's View of LDAP, 1998.*

Howes et al., Network Working Group, RFC 1823, The LDAP Application Program Interface, Aug. 1995.*

Netscape Communications Corporation, an Internet Approach to Directories, 1997.*

NCSA Mosaic for MS Windows User Guide, Mar. 1996.*

Stan Gibson, PC Week, Net Rx: A Little LDAP wiil do ya, Dec. 1996.*

Lee Bruno, A Tighter Rein.*

Amy Doan, GroupWise to get a Jolt, Feb. 1997.*

W. Yeong, Lightweight Directory Access Protocol, Network Working Group, Mar. 1995.*

DAve Kosiur, LDAP: The Next–Generation Directory?, Oct. 1996.*

Gordon Benett, LDAP: A Next Generation Directory Protocol, Aug. 1996.*

Howes et al., The SLAPD and SLURPD Administrators Guide, Apr. 1996.*

NCSA HTTPd Development Team, NCSA HTTPd Directory Indexing, Jul. 1995.*

Yeong et al. RFC 1777, "Lightweight Directory Access Protocol", Mar. 1995.*

* cited by examiner

MANAGEMENT OF AND ACCESS TO INFORMATION AND OTHER MATERIAL VIA THE WORLD WIDE WEB IN AN LDAP ENVIRONMENT

FIELD OF INVENTION

The present invention relates to improved management of and access to information, images and other material via the World Wide Web Internet service.

BACKGROUND OF INVENTION

A 'network' of computers can be any number of computers that are able to exchange information with one another. The computers may be arranged in any configuration and may be located in the same room or in different countries, so long as there is some way to connect them together (for example, by telephone lines or other communication systems) so they can exchange information. Just as computers may be connected together to make up a network, networks may also be connected together through tools known as bridges and gateways. These tools allow a computer in one network to exchange information with a computer in another network.

The Internet is a network of networks having no single owner or controller and including large and small, public and private networks, and in which any connected computer running Internet Protocol software is, subject to security controls, capable of exchanging information with any other computer which is also connected to the Internet. This composite collection of networks which have agreed to connect to one another relies on no single transmission medium (for example, bidirectional communication can occur via satellite links, fiberoptic trunk lines, telephone lines, cable TV wires and local radio links).

The World Wide Web Internet service ('Web' hereafter) is a wide area information retrieval facility which provides access to an enormous quantity of network-accessible information. Information about the World Wide Web can be found in "Spinning the Web" by Andrew Ford (International Thomson Publishing, London 1995) and "The World Wide Web Unleashed" by John December and Neil Randall (SAMS Publishing, Indianapolis 1994). Use of the Web is growing at an explosive rate because of its combination of flexibility, portability and ease-of-use, coupled with interactive multimedia presentation capabilities. The Web allows any computer connected to the Internet and having the appropriate software and hardware configuration to retrieve any document that has been made publicly available anywhere on the Internet. The retrievable documents on the Web include 'HyperMedia' documents—i.e. documents which may be text documents or other forms of media such as sounds and images and which may have links ('hyperlinks'—see below) to other documents. The format of such documents on the Web is a standard format in HTML (HyperText Markup Language), such that a document created on one operating system and hardware platform can be read by a user on any other platform that has an appropriate Web Browser (see below). HTML is associated with a specific communication protocol known as HyperText Transfer Protocol (http). Images may be stored in separate graphics files, for example in standard GIF or JPEG format, which are referenced in the HTML text for retrieval with the HTML text.

Users access this information using a 'Web Browser', (also referred to as a 'Web Client Browser'), which is software installed on the user's computer and having facilities for serving or retrieving documents from a Web Server via the Internet. Currently available Web Browsers include WebExplorer(TM) from IBM Corporation, Netscape Navigator from Netscape Communications Corporation, Internet Explorer from Microsoft Corporation, and Mosaic from NCSA. Such Browsers understand HTML and other Web standard formats and can display or output files correctly in these formats. The Web is structured as pages or files which each have a particular Universal Resource Locator (or URL). The URL is a reference which denotes, amongst other things, both the server machine and the particular file or page on that machine. A user can type in particular URLs or jump from one page to an associated page by means of 'hyperlinks'—that is, a word or symbol on a page can be associated with a URL for another page which is selectable to cause the Browser to send a request which retrieves, and then to display, the relevant page. The preferred user interface for such Browser selection is the graphical 'point-and-click' interface (i.e. links are selected by moving a cursor to a particular word or symbol on display and then pressing a mouse button). The words, images and symbols having associated hyperlinks are identifiable by a user as "hot spots" (for example, the relevant text may be highlighted or underlined, or the cursor may change its appearance as it passes over the hot spots). There may be many pages resident on a single server, and associated hyperlinked pages may be located on different servers.

Web pages are thus well known to be identifiable through URLs, such as http://www.pc.ibm.com/data.htm. This example illustrates three components of the URL: "http" identifies the protocol to be used by a Web client browser for access to the page; "www.pc.ibm.com" identifies the target computer (this computer name is converted to its numeric-form Internet address); and "data.htm" identifies the page to be accessed on that computer. More complex examples having additional parameters are also possible, such that specific data may be passed from the client computer to the server computer in a URL specification.

In order to facilitate easy return to a particular Web page at a later time without having to retrace the original steps which led to discovery of the target Web page, URLs and associated descriptors (which by default are taken from the Web page, but are editable) can be saved as "bookmarks" at the client computer. Such a scheme is shown in FIG. 1, in which URLs and descriptors for specific Web pages 10 are stored as bookmarks 20 stored at a client computer system 30. User selection of such a bookmark at the client system initiates a request for downloading to the client system from a server system 40 of the respective Web page 10. The user can then select hyperlinks 50 within a downloaded Web page to access other Web pages of interest (which may be on other server computers as shown).

This scheme is commonplace and has proven extremely successful. However, it gives rise to a number of problems which affect both clients and servers.

From a client perspective:

a URL stored in a bookmark may not be valid when re-used (e.g. the Web page has been deleted prior to the attempted re-access); in this case the access fails and the user receives a generic failure message. It is not possible to supply the user with reasons for the Web page deletion or to provide alternative destinations of possible interest.

a URL stored in a bookmark may identify a busy Web page; at the time of re-use access may not be possible because of the demands of other users. Unfortunately it is not possible to re-direct the browser to an alternative Web page (which could have been set up to contain identical information).

From a server perspective:
- re-organization of a Web site is difficult because of the desire to preserve the integrity of URLs previously used and stored as bookmarks in unknown clients.
- similarly, the embedded URLs in web pages mean that the movement of a web page requires hyperlinks in other pages to be updated to maintain the validity of the reference.
- lists of alternative URLs need to be provided on web pages to cope with expected demand for the content; this is especially true when the URLs point to files to be downloaded (URLs of the form "ftp:// . . . ", where the prefix now indicates the use of the file transfer protocol) because each user consumes considerable resources. Such lists are tiresome for users, take valuable page space, and do not provide effective load balancing across the multiple servers.

SUMMARY OF INVENTION

In a first aspect of the invention there is provided an access mechanism for accessing material via the World Wide Web. Web pages typically include hyperlinks for accessing associated Web pages stored at the same or at different Web server computers. According to the invention, at least some of these hyperlinks comprise links to one or more directories and the directories store URLs for accessing particular Web pages. The access mechanism includes access logic, responsive to user selection at a Web client system of a hyperlink comprising a link to one of the directories, for retrieving from said directory a particular one or plurality of said stored URLs and for accessing at least one of said particular Web pages using said retrieved URL.

Directories are repositories of objects (i.e. directory entries are known as objects) which are organized to support locating of those objects. Objects comprise one or more attribute-value pairs. For example, a 'person' object may have a 'name' attribute with value 'Steven Jones', and a 'telephone number' attribute with value '0171-815000'. Typically a directory is an hierarchical arrangement of named objects, where each object comprises one or more attribute-values relating to that object. Directory look-up operations use structured queries which typically identify (1) a named object in the hierarchy for the start of a search, (2) a depth of search condition, (3) a set of attribute-value assertions to be satisfied by candidate objects, and (4) a set of attributes to be returned for the candidate objects. The type of directory objects (and the type of query) will vary for different directories. For example, an application may perform an attribute-value type query on an Access Control Server via a defined protocol such as LDAP (described below under 'Detailed Description of Preferred Embodiments') to obtain a directory object comprising a person's access rights attributes. Another attribute-value query on a Network Name Server may seek network addresses for servers, printers and other devices.

To enable locating of particular items of interest within the enormous quantity of information and other material (such as audio and video) which is available for public access from Internet Web pages, it is known to organize Web pages and files using directories and to access the directory objects using structured user-input directory-search queries. However, it is not known to provide URLs within Web page hyperlinks which are directory-reference URLs and to provide access logic for automatically retrieving Web page URLs stored in a directory when a user selects a hyperlink including a directory-reference URL.

The present invention involves storing of Web page URLs as attribute-values of certain directory objects and providing Web page hyperlinks to those directory objects together with access logic responsive to the hyperlinks for retrieving the URLs for use by a client. This indirect access to Web pages via hyperlinks to directories has significant advantages for Web page organization and facilitates more flexible methods of Web page access than the known use of hyperlinks which include URLs pointing directly to the target Web pages. use of the present invention within systems and methods in which access to Web pages and files is required gives a number of important advantages:

- Web pages within a site, or across sites, can be re-organized without invalidating directory-reference links stored in bookmarks; such links can be responded to intelligently even when the original target Web page has been deleted, or the client can be furnished with new links to content.
- an 'intelligent' directory can furnish different indirect references to achieve effective load balancing.
- indirect access through a directory provides an additional level of access control, and this can be used to make the reference supplied from the directory object dependent upon the identity of the client.
- since the directory objects form an inventory of Web pages, Web page management is facilitated.
- the directory can store index data in association with Web page URLs, and access to the directory through a Web Browser supporting LDAP allows these index terms to be searched; this provides much richer access paths to required material, complementing the known hyperlink mechanism.

The access logic for retrieving URLs and accessing Web pages preferably comprises an applet for execution on the Web client system which is adapted to interact with a Web Browser on the client system and with a directory server. In the preferred embodiment of the invention, when a Web page having a directory-reference hyperlink is downloaded to a client system from a Web server system and the directory-reference hyperlink is selected, a determination is made of whether the required applet is already available on the client system. If not, then the applet is requested from the directory server and is stored thereafter on the client system for use in future interactions with the directory server. Such applets could equally be stored at Web server computers together with Web pages which include directory-reference hyperlinks.

The applet is executed on the client system when a directory-reference hyperlink is selected, the applet then initiating the sending of a request from the client system to a directory server to obtain the URL (or URLs) associated with the particular hyperlink. The directory server returns the URLs to the applet at the client system which passes at least a first one of the URLs to a Web Browser running at the client system. The Web Browser then uses this URL to access the required Web page as is known in the art. In this preferred embodiment, the Web Browser may be a conventional Browser operating in the normal way except for the performance of an intermediate directory access process prior to a Browser request being sent to the server which holds the required Web page. This intermediate process preferably does not require any additional user interactions and is 'invisible' to the user—a Web page or file is displayed to a user at the client system automatically following user selection of a directory-reference hyperlink. Alternatively, in embodiments in which a plurality of URLs can be retrieved from the directory and passed to the Web Browser by the applet, the user may be required to select from a list of obtained URLs.

In an alternative embodiment of the invention, the access logic for retrieving URLs and accessing Web pages is implemented as an integral feature of the program code of a modified Web Browser rather than using a separate downloaded applet. That is, the Web Browser itself responds to directory-reference hyperlinks by sending a request to a directory server. The Web Browser may also be responsible for automatic selection from a plurality of retrieved URLs. The above may be referred to as 'client-side' implementations of the invention.

In alternative embodiments of the invention, the operations which are performed at a Web client system may be substantially unchanged from prior art Web browsing operations, but with retrieval of URLs from a directory in response to directory-reference hyperlinks being performed at the server. In one such embodiment, a server computer obtains requested Web pages from storage in response to a client request as is known in the art. The server computer is programmed to scan the retrieved Web pages for embedded directory-reference URLs. If a directory-reference URL is found, the server computer then contacts the directory to retrieve the specified directory object. The server processes the directory object to obtain a Web page URL (an attribute-value of the object) and modifies the Web page to include this URL before returning the Web page to the client. This may be referred to as a 'server-side' implementation of the invention.

The scanning of Web pages to detect directory-reference URLs may, alternatively, be made conditional on the particular content of the Web page, or on a logic prediction of the likelihood of user interaction with a directory-reference URL, or on an event such as the user at the client end having indicated a desire to interact with the directory-reference URL.

According to another 'server-side' embodiment of the invention, when a user selects a directory-reference hyperlink within a Web page (for example from a bookmark at the client system), a Web Browser request is invoked in the standard way except that the request uses the LDAP protocol and is sent to a particular server computer specified in the request, on which server the referenced directory is stored. The directory server computer responds to a received request by retrieving from the directory database the appropriate URL or URLs and returning one of these to the Web Browser. The Web Browser then sends a request to the server computer identified by the returned URL. It is not a preferred feature of this embodiment for multiple URLs to be returned to the client, but rather a single URL is returned to the client which then initiates access. Since the client then initiates Web page access using a single URL, the protocol requested by the client is consistent with the protocol returned to the client.

A further server-side embodiment of the invention has more of the functions which are provided by the client computer system in the above-described embodiments implemented instead in a directory server system. Directory-reference hyperlinks invoke client requests to a directory server. The directory server both obtains one or more relevant URLs and sends requests to one or more relevant servers using the obtained URLs. Such requests received from the directory server by a target server computer specify the directory server as the initial target destination for responses from the servers, rather than responses being sent directly to the Web Browser at the client system. This enables the directory server to perform selection between responses where a plurality of associated responses are received at the directory server within a preset time period.

The invention according to one 'server-side' embodiment of the invention provides a method, implemented by a Web server computer which is adapted to access one or more directories storing directory objects whose attributes include Web page URLs, of processing Web pages retrieved by a Web server computer in response to a request from a Web client computer. The method comprises:

accessing a storage means in response to a request from a Web client computer and retrieving a requested Web page;

scanning the retrieved page for directory-reference URLs specifying particular directory objects;

on detection of a directory-reference URL, requesting the specified directory object from the referenced directory;

on receipt of the requested directory object, processing the directory object to obtain a Web page URL and incorporating the Web page URL within the retrieved Web page;

returning the processed Web page to the Web client computer.

According to one 'client-side' embodiment of the invention, there is provided a method of accessing Web pages, implemented by a Web client system which is adapted to access one or more directories storing directory objects whose attributes include Web page URLs, wherein Web pages include hyperlinks for accessing associated Web pages stored at Web server computers and at least some of said hyperlinks comprise links to said one or more directories, the method comprising:

responsive to user selection at a Web client system of a hyperlink comprising a link to one of said directories and specifying a particular directory object, accessing said directory to retrieve the particular directory object;

processing the directory object to obtain a Web page URL from the directory object; and accessing the Web page using the obtained URL.

The invention according to a further aspect provides a data processing system comprising:

at least one client computer having a Web Browser installed thereon;

at least one server computer storing Web pages identified by Web page URLs, certain of said Web pages including hyperlinks for accessing associated Web pages; and a directory comprising at least one server computer storing a directory database in which directory objects have Web page URLs as attributes;

wherein at least some of said hyperlinks comprise links to the directory specifying particular directory objects and wherein the system includes access logic, responsive to user selection at a client computer of a hyperlink comprising a link to the directory, for retrieving from the directory a particular directory object, processing the directory object to obtain a Web page URL, and accessing the Web page identified by the URL.

The present invention is thus implementable in a client data processing system or in a server data processing system of a distributed data processing network.

As well as supporting provision to a user at a client system, in response to invoking of a directory-reference hyperlink, of individual Web pages that were stored at Web servers, the present invention also supports 'cgi.bin' type requests which invoke (and provide data to) the cgi-bin program. Material presented to the user may be a dynamically generated file (for example, combining information from a plurality of different Web pages).

BRIEF DESCRIPTION OF DRAWINGS

Preferred embodiments of the present invention will now be described in more detail, by way of example, with reference to the accompanying drawings in which.

DETAILED DESCRIPTION OF PREFERRED EMBODIMENTS

Figure 1:
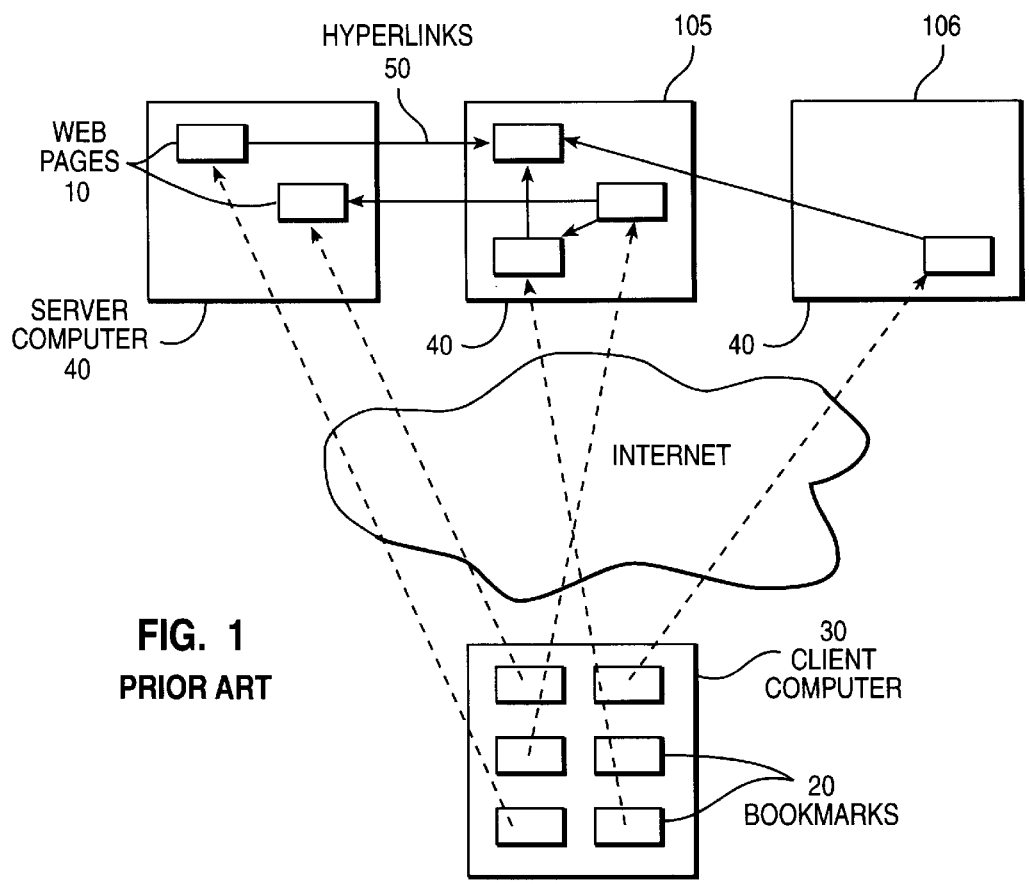
FIG. 1 is a schematic representation of the prior art interaction between a client system and a server system in which the client requests access to required Web pages directly using URLs (which may be stored in bookmarks at the client). Hyperlinks between Web pages at the server enable hopping between associated pages.
Figure 2:
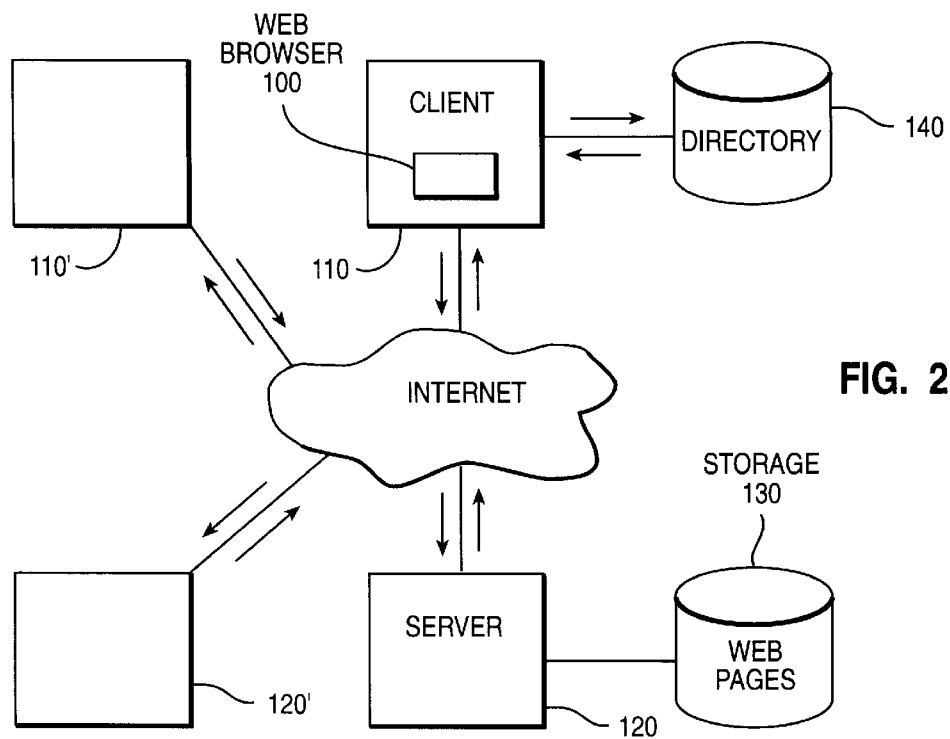
FIG. 2 is a schematic representation of a network of client and server computers in which is implemented a client-side embodiment the present invention.

A client-server data processing network in which the present invention is implemented is represented schematically in FIG. 2. A Web Browser program 100 is installed on a client computer system 110 and accesses Web pages by sending requests to a Web server computer 120 hosting Web pages in its local storage 130. The Web server is connected to the client system via the Internet. Only two client computer systems and two server computer systems are shown for simplicity.

As is known in the prior art, a Web server computer name is specified at the client system, by a user at the client system entering a URL for a Web page of interest (for example, "http://www.ibm.com/News/" identifies a specific computer "www" within the organization identified by "ibm" within Internet class "com" (commercial)). Alternatively the user selects a bookmark stored at the client Browser which includes the URL.

The computer name is then converted by a name server facility into an a numeric Internet address (of the form "29.5.19.66"). All TCP/IP based applications are aware of the name server facility and automatically go to a designated name server computer to request resolution of a computer name into an Internet address before attempting to make a connection to another computer in the network. The conversion of specified names to addresses involves a table lookup of a list maintained by the name server computer. The storage of computer name-address lists, and the function of performing the conversion, is distributed throughout the Internet. That is, a client server is configured with information regarding how to access its local name server computer, and if an address cannot be determined locally then the local name server computer accesses another name server computer within the hierarchy until the address is obtained. The Internet address is then provided to the client computer which can then use this address to send a request to the relevant server computer.

The server computer responds to a received request by retrieving from its storage the specific file or page identified in the request and then sending it back to the client system. The Web Browser then manages displaying of the contents of the file at the client system.

The present invention provides apparatus and a method for accessing Web pages and files of interest wherein a client system request may differ from the specification of a particular target computer and file in the conventional way described above. The present invention makes use of the wide adoption of directories for facilitating efficient access to Web pages.

A specific protocol has been proposed to provide access to the X.500 Directory without incurring the resource requirements of and without the complexity of the Directory Access Protocol (DAP). This protocol, the Lightweight Directory Access Protocol (LDAP), has been widely adopted for Internet applications and in particular for facilitating efficient access to the enormous quantity of data which is available in Web pages and organized by directories. LDAP is described by Yeong et al in the Request For Comments document "Lightweight Directory Access Protocol", Internet RFC-1777, Performance Systems International, University of Michigan, ISODE Consortium, March 1995. The general protocol model of LDAP comprises clients performing protocol operations against servers. This is accomplished by a client transmitting a protocol request describing the operation to be performed to a server, which is then responsible for performing the necessary operations on the Directory. Using LDAP, URL references for accessing objects within a directory are of the form "ldap:// . . . " The resolution of a server computer identification within an LDAP URL into a numeric address is performed by a name server facility in the same manner described above in relation to standard Internet addressing.

A directory lookup process then involves stepping through a hierarchy of directory objects in accordance with the particular client request. For example, a named directory object specified in the request using its Distinguished Name 'uk.ibm.hursley.printers' is located by stepping down the directory hierarchy from the root to 'uk', then to 'ibm', then 'hursley', then 'printers'.

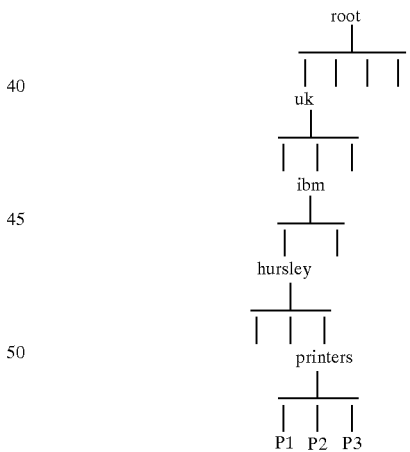

The request also specifies a depth of search condition, an attribute-value assertion and what attributes are to be returned to the requester. LDAP supports three depth alternatives: 0 (i.e. only the object itself), 1 (only the object's immediate children, and not itself), or n (the complete subtree of the hierarchy including the object itself and everything underneath). In the present example, the depth condition may be 1 (for individual printer objects). An attribute-value assertion may be, for example, 'Paper=A3' (i.e. the capability of printing on A3 paper), and the attribute to be returned may be the locations of the printers meeting the criteria. Upon completion of these operations, the server returns a response containing any results or errors to the requesting client.

LDAP, originally targeted at simple management applications and Browser applications that provide simple read/write interactive access to the X.500 Directory, has now been widely adopted by the Internet community and is being proposed as a standard through the procedures of the Internet Engineering Task Force (IETF). In accordance with the prior art, directories have been used within the Internet environment for the storage of data such as organizational information, telephone data (e.g. telephone white and yellow pages), and resource descriptions such as the location, capabilities and access parameters for printers and other devices.

The present invention is implemented in a network (for example, in the Internet environment or in an Intranet) including a plurality of client computer systems, many of which are running Web Browser programs, and a plurality of server computer systems which have Web pages stored thereon, the Web pages being identifiable by specific URLs. A directory 140 is accessable through the LDAP protocol.

Web pages held in storage at the server systems contain the usual embedded links including hypertext references to URLs (href=http:// . . . ). According to the invention, certain of the embedded links are specified as directory-reference URLs. That is, these embedded links include attribute contents of named LDAP directory objects. Such objects will be referred to as Page Pointer Objects (PPOs) hereafter. When a user selects such an embedded link from a Web page, a message is sent to the named directory object.

The LDAP directory contains one or more PPOs together with its more conventional contents. A PPO is an LDAP object which, according to the preferred embodiment, has the following characteristics:

It is identified by a Distinguished Name, following normal LDAP conventions.

It contains one or more attribute-value pairs, again following normal LDAP conventions. However, a number of the attributes have special significance for the present invention:

- a ContentURL contains an unordered list of URLs for a desired Web page. Each URL supplies an alternate address for the same page—multiple addresses being provided to enable high availability and support for load balancing.
- a FallbackURL is similar to the ContentURL, except that the addresses point to an alternate page content which should be accessed if the desired page content cannot be reached through any of its URLs.
- a FailureURL is similar to a FallbackURL except that the addresses point to a generic failure page content, accessed only if both the desired and fallback pages are unreachable.

It has a unique object class to identify the nature of the object.

Two alternative embodiments of the invention, which are not mutually exclusive, will now be described in more detail. A 'client-side' implementation using a conventional Web server and resolving the directory-reference URLs through client activity will be described with reference to FIGS. 2 and 3. A 'server-side' implementation using a conventional Web client and resolving the directory-reference URLs through server activity will be described with reference to FIGS. 4 and 5.

Referring to FIG. 2, a user working at client system 110 typically retrieves a bookmark of interest from local storage and a Browser at the client system makes an http request to a Web server 120 for the page represented by the URL included in the request. The server 120 retrieves the page from local storage 130 and responds to the client with the page content. The Web Browser controls displaying of the retrieved pages at the client system. The page will typically contain hyperlinks with embedded URLs. Certain pages contain one or more directory-reference URLs in the form:

ldap://srvhost[:port]/dn[?ContentURL,FallbackURL, FailureU RL[?base[?oc=PPO]]].

The syntax of the above uses square brackets [ ] to denote optional elements. 'srvhost' identifies the host to be contacted; 'port' identifies the port to be used; 'dn' is the Distinguished Name of the PPO; 'base' specifies that the base level object only must be retrieved; 'oc=PPO' specifies that only objects of object class PPO must be retrieved. Where named attributes are specified, this will reduce line traffic by eliminating non-essential object data and has the added advantage of allowing the PPO to have other attributes without interfering with the indirect referencing operation. The base and object class definitions ensure that only the desired PPO object is returned, even in those cases when non-standard defaults have been set and/or the directory contents have been tampered with such that they no longer contain PPOs.

Figure 3:
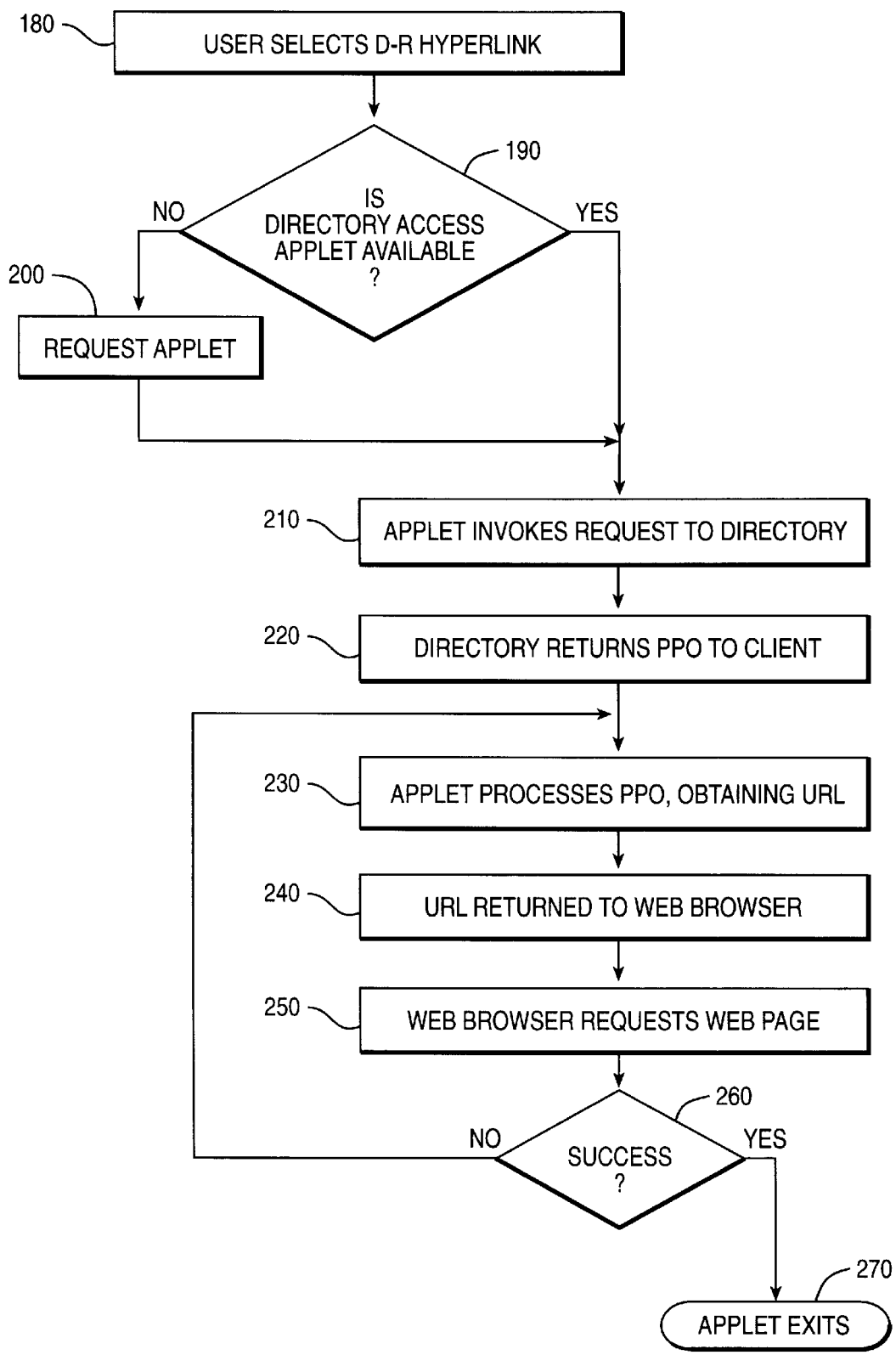
FIG. 3 is a flow diagram representation of Web page access via a directory according to an embodiment of the present invention.

Referring to FIG. 3, if the user at the client system then cursor-clicks 180 on a directory-reference hyperlink of interest, the embedded directory-reference URL is retrieved. This URL is identified as a directory-reference URL and the client system performs 190 a determination of whether logic for performing a directory access function is available at the client system. If not then the client system requests 200 downloading of a specific applet (which may, for example, be written in the Java programming language). The downloaded applet is then executed at the client system, sending 210 a request to the directory which specifies the directory-reference URL for a particular directory object (PPO) including its Distinguished Name. Such directory search requests are asynchronous and so multiple requests can be issued and the results independently processed as they are received. The directory returns 220 the requested PPO to the applet running at the client system.

The applet then processes 230 the PPO. Typically, a single URL is chosen at random from the ContentURL values and returned 240 to the Web Browser. The Web Browser then uses 250 this URL in an attempt to access the relevant Web page. If successful, then the directory access applet exits 270. If unsuccessful, other ContentURL values are chosen 230 for attempting access to the same page. If still unsuccessful, the Fallback values are chosen. This provision of alternative Web page URLs achieves a form of simple load balancing when a number of Web pages having the same or related content are available at different servers. If still unsuccessful, then the FailureURL value is chosen. The contents of the Web page accessed by the FailureURL are specific to a particular PPO or set of PPOs and so the information displayed to the user at the client system will be more useful than a totally generic failure message such as is displayed in prior art systems. Each of the values ContentURL, FallbackURL and FailureURL may address the original Web server computer or any other. According to this embodiment of the invention, multiple URLs are typically returned to the applet at the client system and it is the applet which chooses which URL or URLs to use in the subsequent client requests to Web servers.

Figure 4:
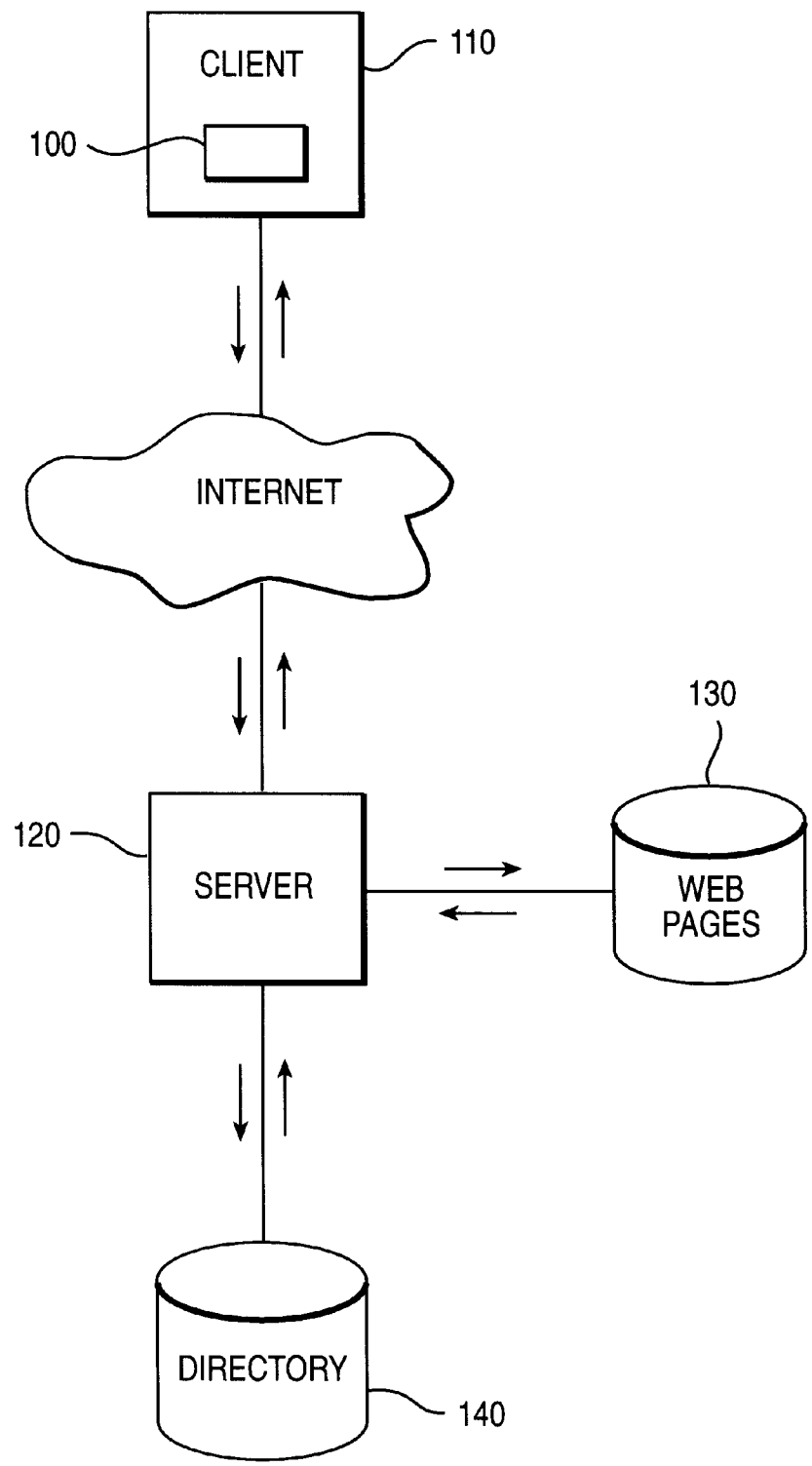
FIG. 4 is a schematic representation of a client-server arrangement of computers in which the present invention may be implemented according to a server-side embodiment.
Figure 5:
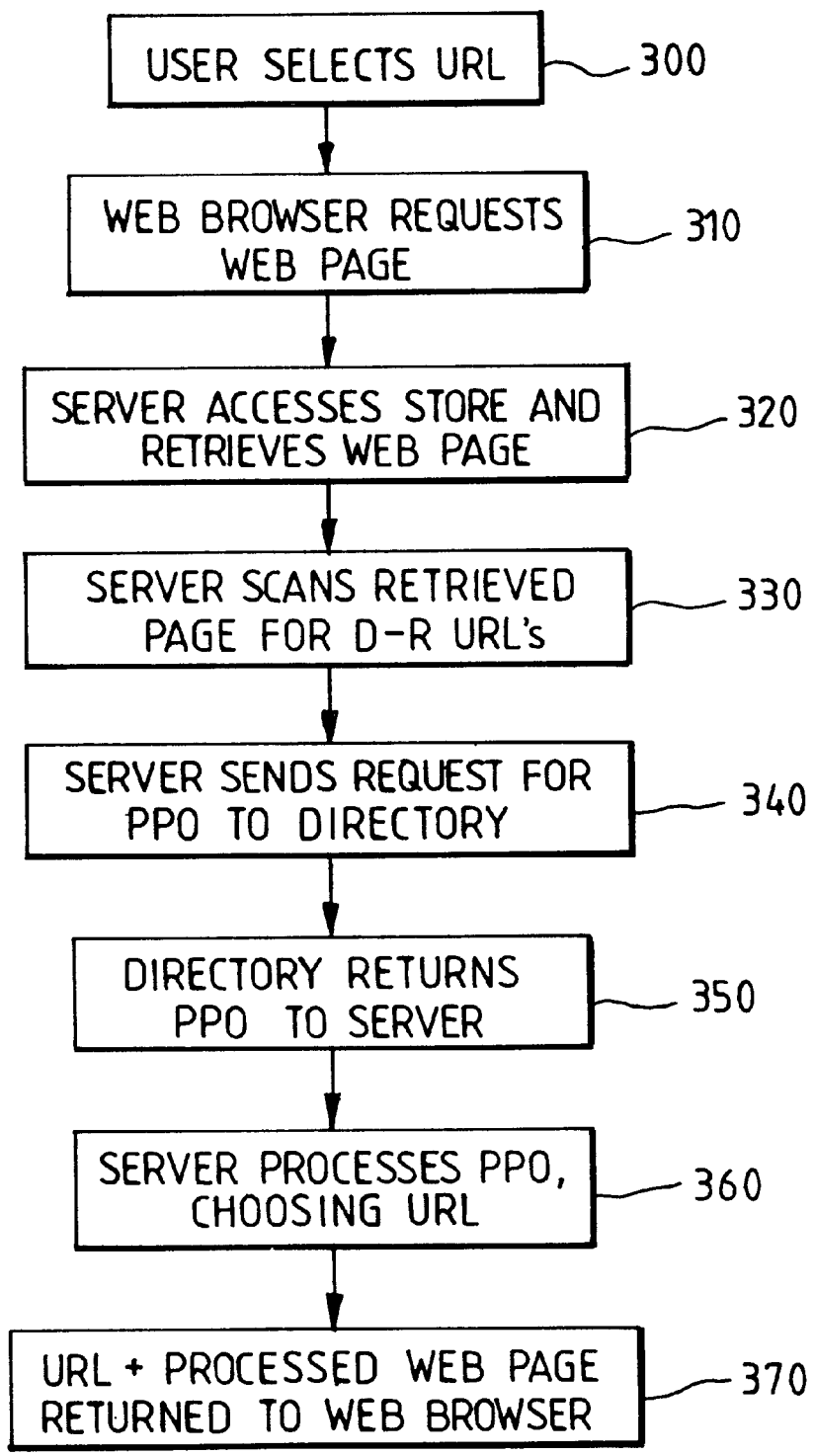
FIG. 5 is a flow diagram showing the steps of Web page access according to a server-side embodiment of the invention.

A server-side embodiment of the invention will now be described with reference to FIGS. 4 and 5. According to this embodiment, a Web server 120 as shown in FIG. 4 performs the processing required to identify LDAP URLs within Web page hyperlinks, to resolve them via a directory 140, and to replace each original link with one based on relevant object data returned from the directory.

The invention is implemented following a user at a client computer inputting 300 a URL, or retrieving from system memory of the client computer a bookmark of interest which includes a URL, which invokes the Web Browser operation of making a request 310 to a Web server for display of the page represented by the URL (e.g. http:// . . . ).

The server computer identified in the request accesses 320 the relevant store, which store may be held at an auxiliary disk storage device connected to the server computer, and retrieves the required Web page. As is known in the art, Web pages often include hyperlinks comprising embedded URLs. According to the present invention, one or more of the URLs embedded in certain of the Web pages are directory-reference URLs in the form:

ldap://srvhost[:port]/dn[?ContentURL,FallbackURL, FailureU RL[?base[?oc=PPO]]].

The server scans 330 the retrieved Web page for such directory reference URLs, which exist in a Web page within an HTML tag (href= . . . ). Upon identification of a directory reference URL, the server contacts 340 the directory by sending an asynchronous request to retrieve the specified PPO. The directory returns 350 the requested PPO.

The server then processes 360 the returned PPO, choosing a URL (firstly a ContentURL attribute value, and if that attribute cannot be found then a value from the FallbackURL attribute would be used, and failing that using a value from the FailureURL attribute). The single selected URL is then returned 370 to the Web client system together with the retrieved and processed Web page.

The multi-fallback semantics provided for server-side implementations of the invention are generally not as rich as where the Web Browser does the processing, and this is a disadvantage of server-side implementations relative to client-side implementations of the invention. The server according to this preferred embodiment does not access the referenced page on behalf of the client, but returns the URL to the client so that it can initiate the access. This ensures that the protocol requested by the client is consistent with the protocol returned to the client. Such a server-side approach may co-exist in a network with a client-side approach.

It is within the scope of the present invention to make use of index terms which are additional to the Page Pointer Object references which are provided within web pages. The PPO references form index terms to one or more Web pages through a directory. A server computer to which a request for Web page access is sent necessarily receives and is responsive to certain information about the client system: the client's Internet Protocol address (unless the access request went through a firewall, in which case it is the IP address of the firewall which the server receives), the language of the client system, its operating system, etc. According to one embodiment of the present information, PPO references may be supplemented with other search terms in requests sent from a client system and a receiving server is responsive to such search terms and/or the received client system information such that the Web pages retrieved according to the present invention vary with the nature of the client system or with search terms provided by the client system.

For example, a server system may hold Web pages including a company's software product manuals together with a list of addresses of customers' computers on which licensed copies of that software is installed. The server may be adapted to permit access to the product manuals only if a received request includes a client address which appears in the list, and to provide access to an alternative Web page containing product ordering information when the client address is not recognised.

Additionally, having stored Web page URLs within a directory in accordance with the invention, the Web page URLs can be associated with other indexing terms suitable for administration. Web page management is then simplified since the Web pages can be accessed using many different search criteria such as date of creation, language, or content.

What is claimed is:

1. A set of components for accessing material via the World Wide Web Internet service, wherein Web pages stored at Web server computers include hyperlinks for use in accessing associated Web pages, wherein some of said hyperlinks comprise directory-reference hyperlinks pointing indirectly to a Web page by providing a link to one or more directory objects of a directory on a directory server computer, said directory objects containing one or more URLs for accessing particular Web pages, and said directory comprising a repository for said directory objects; and wherein the set of components includes:

access logic, responsive to user selection at a Web client system of a directory-reference hyperlink which provides directory object locator information for linking to one or more of said directory objects containing one or more URLs, to perform the following steps:

initiating a request to access said one or more directory objects using said directory object locator information provided by said directory-reference hyperlink and performing a directory retrieval operation to retrieve one or more URLs from one of said one or more directory objects, for accessing a respective Web page stored at a Web server computer; and responding to retrieval of said one or more URLs by initiating a request for retrieval of the respective Web page from the Web server computer using a retrieved URL.

2. A set of components according to claim 1, wherein the access logic comprises:

a first software component for running on the Web client system, the first component being responsive to user selection at the client system of a hyperlink comprising a link to a directory on a directory server computer to initiate sending a request to said directory server computer to perform a directory retrieval operation to retrieve said one or more URLs, and being responsive to receipt from the directory server computer of said retrieved URLs to pass at least one of said URLs to a Web Browser on the Web client system and to invoke the Web Browser to retrieve at least one of said particular Web pages using said URL; and a second software component for running on the directory server computer for performing said directory retrieval operation in response to said request initiated by said first software component.

3. A set of components according to claim 1, including a Web Browser program, wherein said access logic is adapted to trigger said Web Browser program to access a respective Web page in response to said retrieval of said one or more URLs.

4. A set of components according to claim 1, wherein said access logic comprises an applet for execution on the Web client system, the applet being responsive to user selection at the client system of a hyperlink comprising a link to a directory on a directory server computer to send a request to said directory server computer for retrieval of said one or more URLs, and being responsive to receipt from the directory server computer of said retrieved URLs to pass at least one of said URLs to a Web Browser on the Web client system and to invoke the Web Browser to access at least one of said particular Web pages using said URL.

5. A set of components according to claim 1, wherein the access logic is responsive to selection of a directory-reference hyperlink comprising a link to a directory object within a directory, which hyperlink includes a directory-reference (URL) object locator specifying a named directory object, to request the named directory object or related directory objects from a directory in which stored directory objects have particular URLs as attribute values, and on receipt of a directory object having one or more URLs as attribute values to process the directory object to obtain a URL.

6. A set of components according to claim 5, wherein individual directory objects contain a first URL and one or more FallbackURLs identifying alternative Web pages which are obtained for use in a client request when a first Web page identified by the first URL is unavailable.

7. A set of components according to claim 5, wherein individual directory objects contain a first URL and one or more FailureURLs identifying Web pages having content information relating to Web page access failure, which failure information is relevant to the respective directory object.

8. A set of components according to claim 1, wherein the access logic is responsive to selection of a hyperlink comprising a link to an LDAP directory and specifying a directory object Distinguished Name, and optionally specifying additional directory search criteria, to request one or more directory objects from the LDAP directory and, on receipt of a directory object having one or more Web page URLs as attribute values, to process the directory object to obtain a URL.

9. A set of components according to claim 1, wherein the retrieval of URLs from the directory or provision of retrieved URLs to a client system is conditional on the identity of the client system or of an end user at the client system as specified in the client request.

10. A set of components according to claim 1, wherein the access logic is responsive to index data stored in a directory together with Web page URLs for invoking directory access search operations using said index data.

11. A computer program product for accessing material via the World Wide Web Internet service, wherein Web pages stored at Web server computers include hyperlinks for use in accessing associated Web pages, the computer program product comprising computer readable program code on a computer readable recording medium, wherein some of said hyperlinks comprise directory-reference hyperlinks pointing indirectly to a Web page by providing a link to one or more directory objects of a directory on a directory server computer, said directory objects containing one or more URLs for accessing particular Web pages, and said directory comprising a repository for said directory objects, wherein the program code includes:

program code which is responsive to user selection at a Web client system of a directory-reference hyperlink which provides directory object locator information for linking to one or more of said directory objects containing one or more URLs, to control the operation of a system on which it runs to perform the following steps:

initiating a request to access said one or more directory objects using said directory object location information povided by said directory-reference hyperlink and performing a directory retrieval operation to retrieve one or more URLs from said one or more directory objects, for accessing a respective Web page stored at a Web server computer; and in response to retrieval of said one or more URLs, initiating a request for retrieval of the respective Web page from the Web server computer using a retrieved URL.

12. A method for accessing material via the World Wide Web Internet service, wherein Web pages stored at Web server computers include hyperlinks for use in accessing associated Web pages, the method comprising the following steps:

in response to user selection at a Web client system of a hyperlink which comprises a directory-reference hyperlink providing directory object locator information for linking to one or more directory objects of a directory on a directory server computer, said directory comprising a repository for directory objects which contain URLs for accessing particular Web pages, performing the following steps:

initiating a request to access said one or more directory objects using said directory object locator information provided by said directory-reference hyperlink; and performing a directory retrieval operation to retrieve one or more URLs from one of said one or more directory objects, for accessing a respective Web page stored at a Web server computer; and responding to retrieval of said one or more URLs by automatically initiating a request for retrieval of the respective Web page from the Web server computer using a retrieved URL.

13. A data processing system comprising:

at least one client computer having a Web Browser installed thereon;

at least one server computer storing Web pages identified by Web page URLs, certain of said Web pages including hyperlinks for accessing associated Web pages; and a directory comprising at least one server computer storing a directory database in which directory objects have Web page URLs as attribute-values;

wherein certain of said hyperlinks comprise directory-reference hyperlinks pointing indirectly to a Web page by providing directory object locator information for linking to one or more directory objects of the directory, said directory objects containing one or more URLs for accessing particular Web pages, and said directory comprising a repository for said directory objects; and wherein the system includes access logic, responsive to user selection at a client computer of a directory-reference hyperlink which provides directory object locator information for linking to one or more of said directory objects containing one or more URLs, for performing the following steps:

initiating a request to access said one or more directory objects using said directory object locator information provided by said directory-reference hyperlink; and performing a directory retrieval operation to retrieve from the directory a particular directory object, for processing the directory object to retrieve a Web page URL; and in response to retrieval of said Web page URL, initiating a request for retrieval of the respective Web page identified by said Web page URL.

14. A data processing system according to claim 13, wherein the access logic comprises an applet stored at a server computer and available for transfer to a client computer in response to a request from the client system for execution at the client computer.

15. A method of providing an access mechanism for accessing material via the World Wide Web Internet service, wherein Web pages include hyperlinks for accessing material stored in associated Web pages, the method including the steps of:

creating one or more directory objects within a directory, the directory objects having attribute-values including URLs for accessing particular Web pages; and establishing hyperlinks within Web pages comprising directory-reference hyperlinks pointing indirectly to Web pages by providing directory object locator information for linking to one or more directory objects of the directory, said directory objects containing one or more URLs for accessing particular Web pages, and said directory comprising a repository for said directory objects; and providing access logic, responsive to user selection at a Web client system of a directory-reference hyperlink which provides directory object locator information for linking to one or more of said directory objects containing one or more URLs, for initiating a request to access said one or more directory objects using said directory object locator information provided by said directory-reference hyperlink.

16. A method according to claim 15, including:

providing access logic for initiating a request to access a directory object using said directory object locator information provided by a directory-reference hyperlink and for retrieving a URL from the identified directory object in response to user selection at a Web client system of a directory-reference hyperlink which references the particular directory object within said directory, and, in response to retrieval of said URL, for initiating a request for retrieval of a Web page corresponding to said retrieved URL.

* * * * *